US008612488B1

(12) United States Patent
Subramanya et al.

(10) Patent No.: US 8,612,488 B1
(45) Date of Patent: Dec. 17, 2013

(54) EFFICIENT METHOD FOR RELOCATING SHARED MEMORY

(75) Inventors: Sunil Kumar Tekkatte Subramanya, Sunnyvale, CA (US); Pramodh Pisupati, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 435 days.

(21) Appl. No.: 12/882,611

(22) Filed: Sep. 15, 2010

(51) Int. Cl.
*G06F 7/00* (2006.01)
*G06F 17/30* (2006.01)

(52) U.S. Cl.
USPC .......................................... 707/803

(58) Field of Classification Search
USPC ............................................ 707/803, 999.1
See application file for complete search history.

(56) References Cited

U.S. PATENT DOCUMENTS

2009/0132619 A1* 5/2009 Arakawa et al. ............. 707/205

* cited by examiner

*Primary Examiner* — Aleksandr Kerzhner
(74) *Attorney, Agent, or Firm* — Campbell Stephenson LLP (57) ABSTRACT

The present invention provides for an efficient method, apparatus, and system for updating file system information when shared memory contents are moved from one physical location in memory to another. Traditional file systems manage such memory movement at the granularity of physical memory blocks. However, it will often be the case that multiple blocks will be moved, and the present invention takes advantage of the fact that it is more efficient to process the shared memory movement of memory contents at the granularity of an extent. The invention employs a data structure, where each record in the data structure contains information about the shared memory extents of the file system.

19 Claims, 8 Drawing Sheets

EFFICIENT METHOD FOR RELOCATING SHARED MEMORY

FIELD OF THE INVENTION

This invention relates to file systems, and particularly to file system management of shared memory.

BACKGROUND OF THE INVENTION

One responsibility of file systems is the management of memory. File system memory is generally composed of both virtual and physical memory. Virtual memory allows the file system to present a single contiguous memory space for all file system applications while the underlying physical memory may be fragmented or composed of various memory devices with their own physical memory spaces. The file system translates a virtual address into a physical address each time physical memory is accessed. The translation of a virtual address into a physical address is referred to as a mapping from virtual to physical memory.

Physical memory in a file system is often dispersed across many different memory devices. These memory devices can include RAM, one or more internal hard drives, and one or more external memory volumes. Physical memory is typically organized into extents, and extents are subdivided into blocks. The data contents of a file ultimately reside within one or more blocks of physical memory.

Typically, files in a traditional file system are managed by creating a record for each file and organizing all of the records within a data structure. Most file systems refer to these records as modes. Each mode contains mapping information such as the virtual and physical memory addresses of the memory contents, the amount of memory used, and information about the data (e.g. metadata).

Data stored in an extent can be shared between files. One example of when sharing occurs is when a file snapshot is performed by the file system. The created snapshot does not result in a duplication of the original memory contents. Rather, the original file and the snapshot file share the memory contents. Memory contents can be shared among any number of files. Shared physical memory contents are accessed either through the original file or the newly created file.

Some operations in a file system require that data in physical memory be relocated. For example, during the course of creating and deleting files, physical memory may become fragmented. Traditional file systems manage memory relocation at the granularity of physical memory blocks. Fragmented memory occurs when the blocks that together hold the data contents of a single file are not grouped together in a physically contiguous memory area. A defragmentation operation moves the blocks holding the contents of a single file into contiguous memory blocks.

When memory contents are shared among multiple files, additional measures must be taken during data relocation to ensure that each file sharing the memory contents has its corresponding inode correctly updated. More particularly, the mapping information for each inode must be updated to reflect the new physical memory addresses of the blocks storing the shared memory contents. In traditional file systems, the relocation is performed inefficiently due, in part, to traditional file systems not maintaining information on the shared portions of memory any differently than the non-shared portions of memory. It is therefore desirable to create a new data structure to maintain information on the inodes that share data. This new data structure is used for efficiently performing an inode update process. Further, the inode update process can be made even more efficient by having the new data structure maintain extent-level information, instead of the traditional file system maintenance of block-level information.

SUMMARY OF THE INVENTION

The present invention provides for an efficient method, apparatus, and system for updating file system information when shared memory contents are moved from one physical location in memory to another. Embodiments of the present invention provide for efficient updating of file system inodes by using a data structure focused on maintaining information on shared memory at the extent level. Rather than tracking data movement at a block granularity, multiple blocks are moved at an extent granularity.

An embodiment of the present invention introduces a new data structure for maintaining and tracking mapping information of shared memory extents in a file system. This new data structure exists independently from the file system data structure used to maintain information over every file and inode in the file system. The new data structure maintains a record for each extent of memory in the file system that is shared. When the shared memory contents of first and second files are relocated, the mapping information in corresponding inodes must be updated. The process for updating the inodes with new mapping information takes advantage of the new data structure.

An embodiment of the present invention maintains the records within the new data structure in part by incrementing a reference count field within the record each time an additional file shares the extent. Further, each time a file ceases to share the extent, the reference count field is decremented.

An embodiment of the invention initiates the inode update process in response to relocation of the data contents of shared physical memory. The inode update process includes referencing the new data structure to obtain information identifying the inodes sharing the physical memory. Referencing the new data structure includes accessing the record associated with the shared memory area being relocated. The record includes, among other fields, a reference count, a starting block address, and a size variable. The reference count indicates the number of inodes sharing the memory contents, and the reference count is updated each time an additional inode shares the memory contents. The starting block address is the first starting block of the extent in which the shared memory contents are stored. The extent storing the shared memory contents can include one or more blocks. The size variable indicates the number of blocks that are included within the extent.

An embodiment of the invention includes a list of pointers within the record kept by the new data structure. The list of pointers references each inode sharing the extent in order to update the inodes when the shared memory contents are relocated. A drawback in keeping such a list of pointers is additional overhead by the file system. For example, at the point the file system determines that memory contents are shared, the file system now takes additional steps to update the list of pointers within the new data structure with the inodes referencing the shared memory contents. This update to the new data structure is in addition to the update the file system makes to the metadata of each of the inodes that will now share the memory contents. However, the advantage will be that when the inodes need to be updated to reflect the relocation of memory contents, the list of pointers within the new data structure will prevent a complete traversal of all inodes within the file system to find the inodes sharing an extent.

An embodiment of the invention can operate within a multi-volume file system. In this embodiment, each volume in the multi-volume file system is associated with a data structure. For a given volume, each record of each data structure is indexed using a starting block address of the extent within the given volume. Because the volumes can have overlapping physical memory addresses, a separate data structure is used for each volume. Thus, for a given volume, a unique record is associated for the physical starting block address of a shared extent.

Another embodiment of the invention within a multi-volume file system makes use of a single data structure for maintaining the shared memory information for every volume. In this embodiment, an additional key is used for uniquely identifying a physical block address. The additional key in this example would be used because a physical block address alone may not uniquely identify a physical memory address. An additional key can be a volume identifier. Using both the volume identifier and the physical block starting address, the inode update process can uniquely identify a record associated with a shared area of memory.

An embodiment of the invention can operate in a cluster file system. A cluster file system is a computing environment containing multiple computing nodes coupled to the same memory volume or set of memory volumes. In a single volume embodiment of a cluster file system, a single data structure is created for all computing nodes. Each of the computing nodes can perform an operation resulting in a shared extent, and in the initiation of the inode update process. In a multi-volume embodiment of a cluster file system, either a single data structure or a data structure corresponding to each memory volume can be used, as described above with respect to multi-volume environments.

An embodiment of the invention implements the new data structure to maintain information on shared memory as a B-tree. In the interest of presenting a concrete example, the invention will be described in terms of a B-tree instead of a generic data structure. However, any data structure capable of storing a record and retrieving the record can be adapted to the present invention.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description below.

BRIEF DESCRIPTION OF THE DRAWINGS

The present invention is better understood, and its numerous objects, features, and advantages made apparent to those skilled in the art by referencing the accompanying drawings.

DETAILED DESCRIPTION

The task of updating the inodes in a file system referencing shared memory when the shared memory is relocated can be made more efficient by introducing a new data structure focused on storing information on the shared memory. This new data structure would exist independently of the traditional file system maintenance of all memory areas. Using this new data structure provides a file system with a method for managing updates to inodes sharing memory by processing extents instead of blocks. The efficiency gained by the disclosed inode update process will increase as the number of blocks within an extent increases.

For example, when a first file is created and stored, the first file will have an associated first inode within the file system. When, for example, a space-optimized copy is performed, a second file is created, and the second file inode will point to the same extent of memory as the first file inode. The shared memory contents are stored within one or more blocks of memory. When the memory contents become shared, the inodes within the file system require updating to their respective metadata to reflect the new state of sharing memory contents.

An embodiment of the present invention uses a B-tree data structure to store information about a file system's shared memory. A B-tree contains two types of nodes, index nodes and leaf nodes. An index node contains information for directing the search for a leaf node. In this embodiment, an index node includes two or more key values. A leaf node includes a record of the information maintained by the B-tree. In this embodiment, each leaf node in the B-tree includes: (1) information about how many files are sharing a given portion of memory (a reference count); (2) information about the size of the shared memory; and (3) information on the virtual and physical mapping of the shared memory. This B-tree is referred to as a Reference Count Tree B-tree, or an RCT B-tree.

The RCT B-tree is distinct and independent of any other file system data structure used to maintain inode information within the file system. When physical memory contents are relocated, the RCT B-tree is referenced in order to perform an update of the inodes that reference the relocated shared memory.

Figure 1:
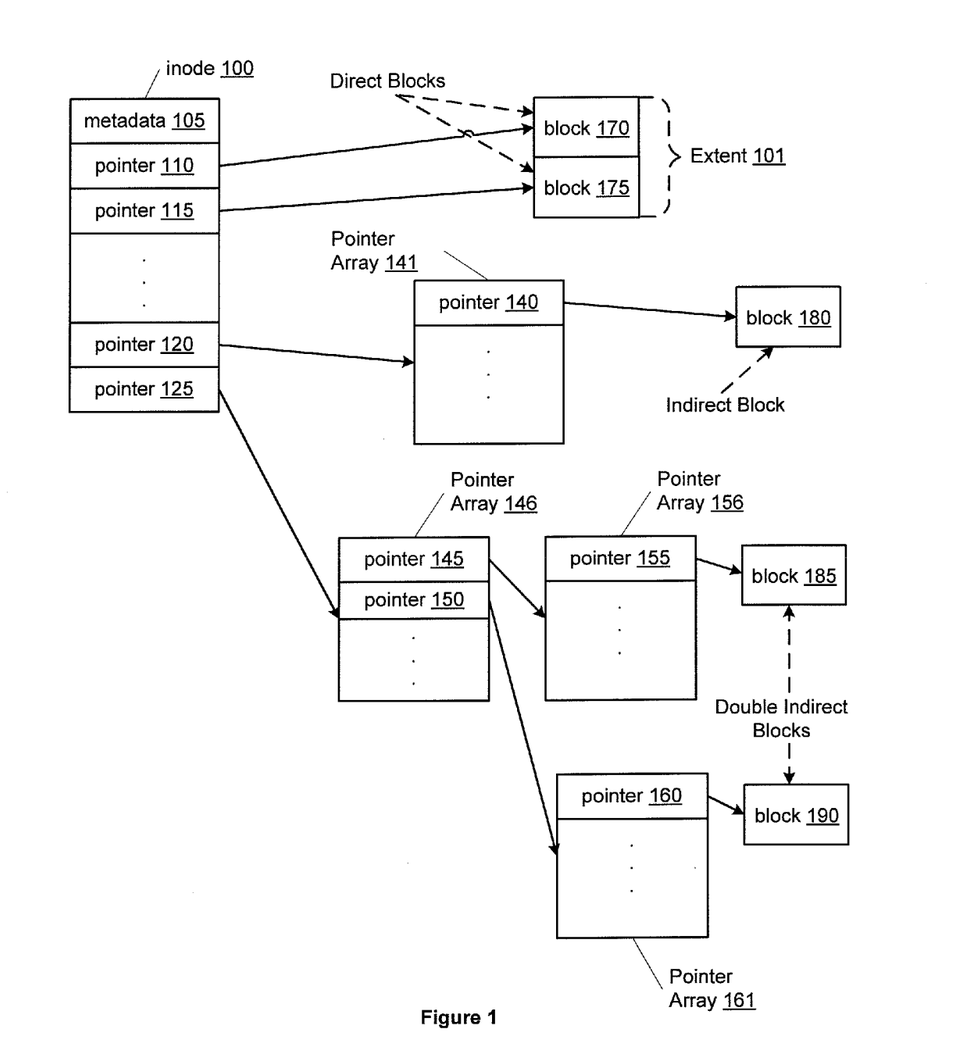
FIG. 1 is an example of an inode within a file system, which is used in conjunction with embodiments of the invention.

FIG. 1 depicts an example of an inode structure in a file system. An inode (100) can include: (1) metadata (105); (2) direct pointers (110-115), each pointing to a physical block of memory (170 and 175); (3) an indirect pointer (120) pointing to an array of pointers (141), where each pointer in the array points to a physical block of memory; and (4) a double indirect pointer (125), pointing to an array of pointers (146), where each pointer in the array of pointers points to another array of pointers (156 and 161), and each pointer then points to a physical block of memory. If the amount of data is small enough, the inode itself may store the data. If the amount of data is large, any level of pointer indirection may be defined to reference any amount of memory. Metadata in the inode includes information about the file. By having a direct set of pointers, an indirect set of pointers, and a double indirect set of pointers, a single inode can reference a very large number of physical blocks. As discussed above, inodes are stored in a file system data structure.

Figure 2:
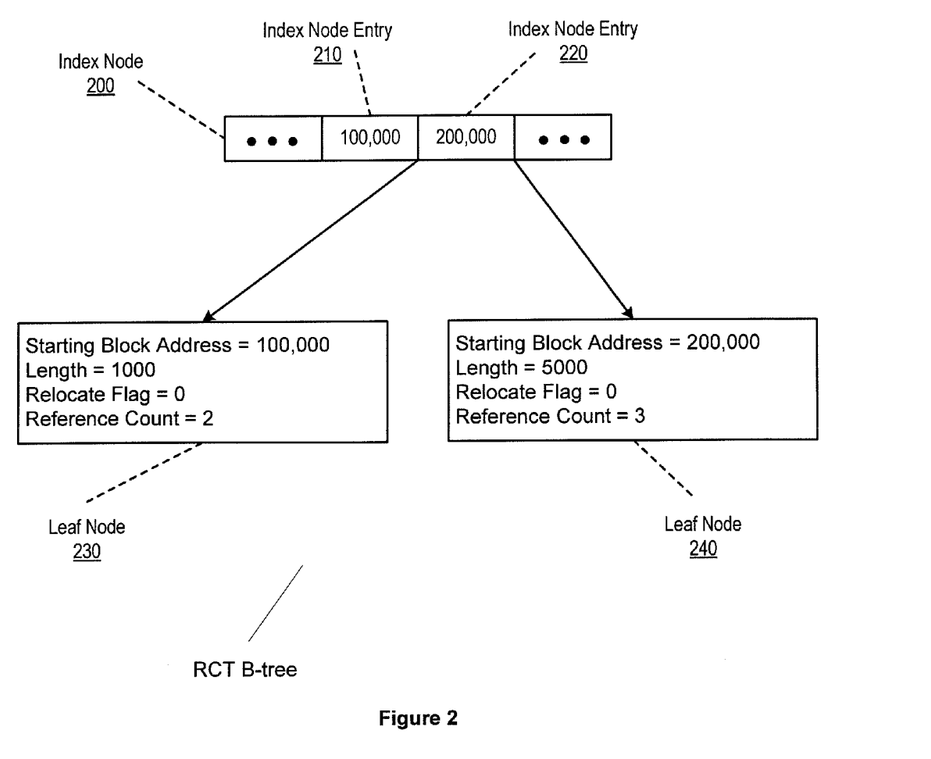
FIG. 2 is an example of a B-tree data structure, which is used in conjunction with embodiments of the invention.

FIG. 2 depicts one example structure for an RCT B-tree. The RCT B-tree includes index nodes and leaf nodes. Each leaf node can contain information corresponding to a shared area of memory. Each leaf node is keyed, or indexed, by the starting block address of the shared area of memory. While the RCT B-tree in FIG. 2 is small, there is no limit to the number of index and leaf nodes that may be present within the RCT B-tree. For every set of files sharing memory contents within the file system, there is at least one leaf node within the RCT B-tree. There can be more than one leaf node in the RCT B-tree for a set of shared files, if those shared files share non-contiguous extents.

Each leaf node of the RCT B-tree includes information about the starting shared block of the extent, the length of the extent starting at that block, a flag indicating whether the physical contents of the referenced blocks have been moved, and a counter of the number of files referencing the shared memory. For example, leaf node 230 in FIG. 2 corresponds to a shared area of memory starting at physical block address 100,000. The Length field of leaf node 230 provides that the number of blocks composing the extent is 1,000. The Reference Count field of leaf node 230 indicates that two files reference this shared space. The Relocate Flag field of leaf node 230 is used during the mode update procedure to keep track of whether or not the contents of the physical memory have already been moved. In this figure, the data referenced by leaf node 230 has not been relocated because the Relocate Flag is zero.

Index node 200 can point to any number of other index nodes or leaf nodes. An index node contains several key values used to navigate to a leaf node. In this example, index node 200 contains an index node entry containing the key value 100,000 (index node entry 210), and an index node entry containing the key value 200,000 (index node entry 220). Given these two index node entries, any leaf node with a starting block address greater than or equal 100,000 and less than 200,000 will be found between these two index node entries. In this example, leaf node 230 is located between key values 100,000 and 200,000.

Figure 3:
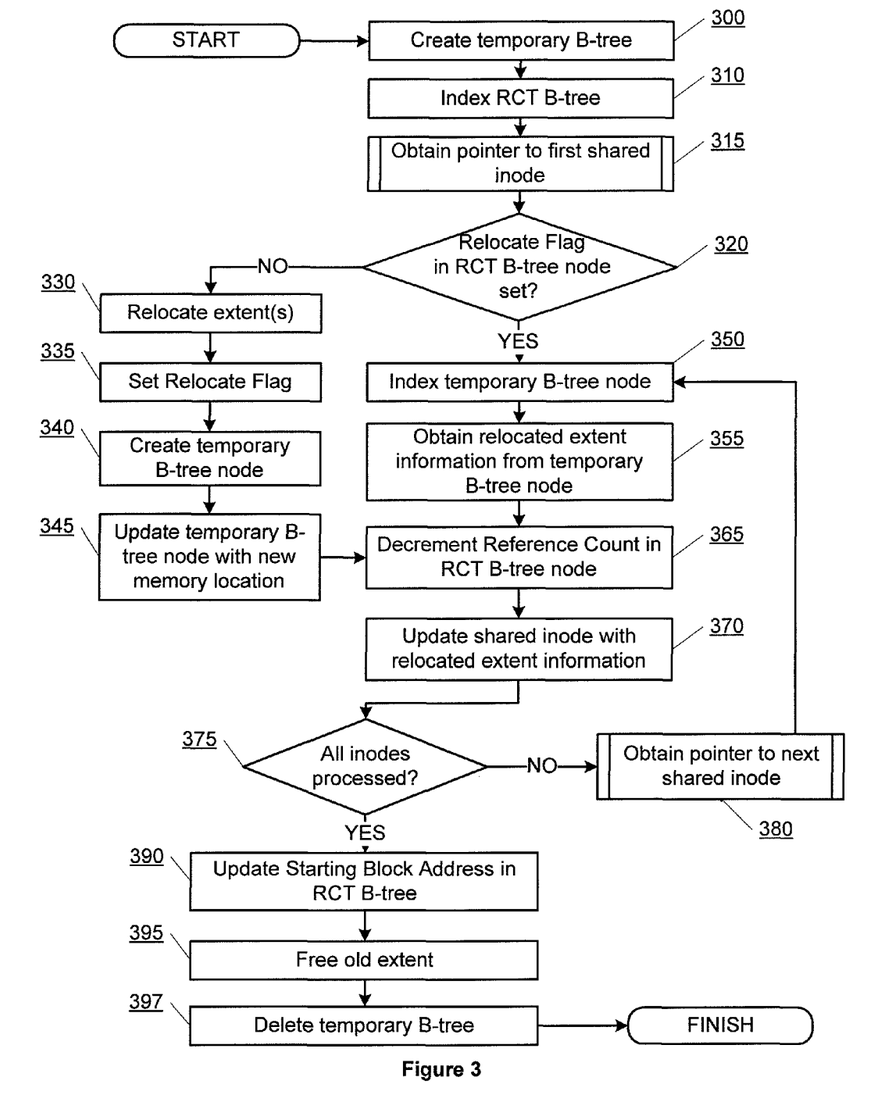
FIG. 3 is a simplified flow diagram illustrating a process for updating inodes sharing physical memory before and after the shared physical memory is relocated, in accord with one embodiment of the present invention.

FIG. 3 is a simplified flow diagram of a process for updating the inodes in a file system when the contents of physical memory are to be moved. A data structure, for example, a B-tree, tracks the shared extents. For purposes of the discussion below, reference is made to an example RCT B-tree, but it should be understood that embodiments of the present invention are not limited to a specific data structure.

In this example, the inode update process begins by creating a temporary B-tree (300) and using a starting block address of shared physical memory to find a leaf node in the RCT B-tree containing information about the shared physical memory (310). The starting block address serves as a key, which is used to compare against index node entry values of the index nodes in the RCT B-tree. Using an example starting block address of 100,000 as the key for the RCT B-tree, a leaf node will be identified. Once the leaf node is found, the Reference Count field in the leaf node indicates the number of inodes to be updated and information that can identify the inodes. In this example, the Reference Count field of the example leaf node provides that two inodes share the extent starting at starting block address 100,000 with a length of 1,000 blocks. The length in blocks of the shared extent is provided by the Length field of the leaf node.

The temporary B-tree created is in addition to any other file system data structure and the RCT B-tree. The temporary B-tree is similar in structure to the RCT B-tree and maintains information helpful to the overall inode update process. The temporary B-tree holds memory mapping information for both the original memory mapping of the inodes as well as new memory mapping information with which to update the inodes. Upon creation, the temporary B-tree is empty. At the completion of the inode update process, the temporary B-tree is deleted.

In this example, the extent beginning at block address 100,000 will be moved. The block address is used to identify the file system inodes that share this extent. For each identified inode, an update of the location of data referenced by the inode is based on the information in the RCT B-tree and the temporary B-tree.

A traversal through each inode in the file system is performed in order to identify every inode with a starting physical block address that matches the starting block address of the shared extent (315). In this manner, the first inode that matches the physical block address of the shared extent is identified.

At this point, the RCT B-tree leaf node has been identified, the temporary B-tree has been created, and the first inode has been identified. Now, the leaf node is accessed to determine whether the Relocate Flag indicates that the extent contents have been moved (320). Because this is the first inode processed, the Relocate Flag in the example leaf node will not be set, indicating that the contents have not been moved.

If the Relocate Flag indicates that the extent contents have not been moved, the extent contents are relocated (330). In this example, the contents of the extent are moved to a new physical memory address of 50,000. Upon completion of the move, the Relocate Flag in the RCT B-tree leaf node is set (335). Since all inodes have yet to be processed in this example, the extent at the old physical address is not freed. The old physical address will not be freed until all inodes have been updated to reference the new physical memory location of the moved extent contents.

Next, a leaf node in the temporary B-tree is created (340) to hold the new and old mapping information for the extent contents to be moved (345). The old mapping information is the physical memory address where the extent is currently located; the new mapping information is physical memory address where the extent will be relocated.

The temporary B-tree leaf node is updated to the original reference count in the RCT B-tree node. In this example, the RCT B-tree leaf node indicates a reference count of 2. The leaf node in the RCT B-tree is updated by decrementing the Reference Count field (365). In this example, the Reference Count field of the example RCT B-tree leaf node is decremented from 2 to 1, indicating that another inode references the shared data location. The first inode is updated to reference the new extent location (370). In the example RCT B-tree leaf node, the physical block starting address is updated to 50,000.

The reference count of the RCT B-tree leaf node is then accessed to determine whether all inodes sharing the original memory location have been processed (375). If not, then a pointer is obtained to the next inode sharing the original extent location (380). Continuing with the current example, since the Reference Count field of the RCT B-tree leaf node is currently 1, there remains a second inode to process. Once the second inode is identified by a traversal through the file system inodes, the inode update process re-iterates (350).

Since the extent contents have already been moved, this iteration begins by accessing the temporary B-tree leaf node (350) to obtain the new mapping information in order to update the current inode (355).

Figure 5:
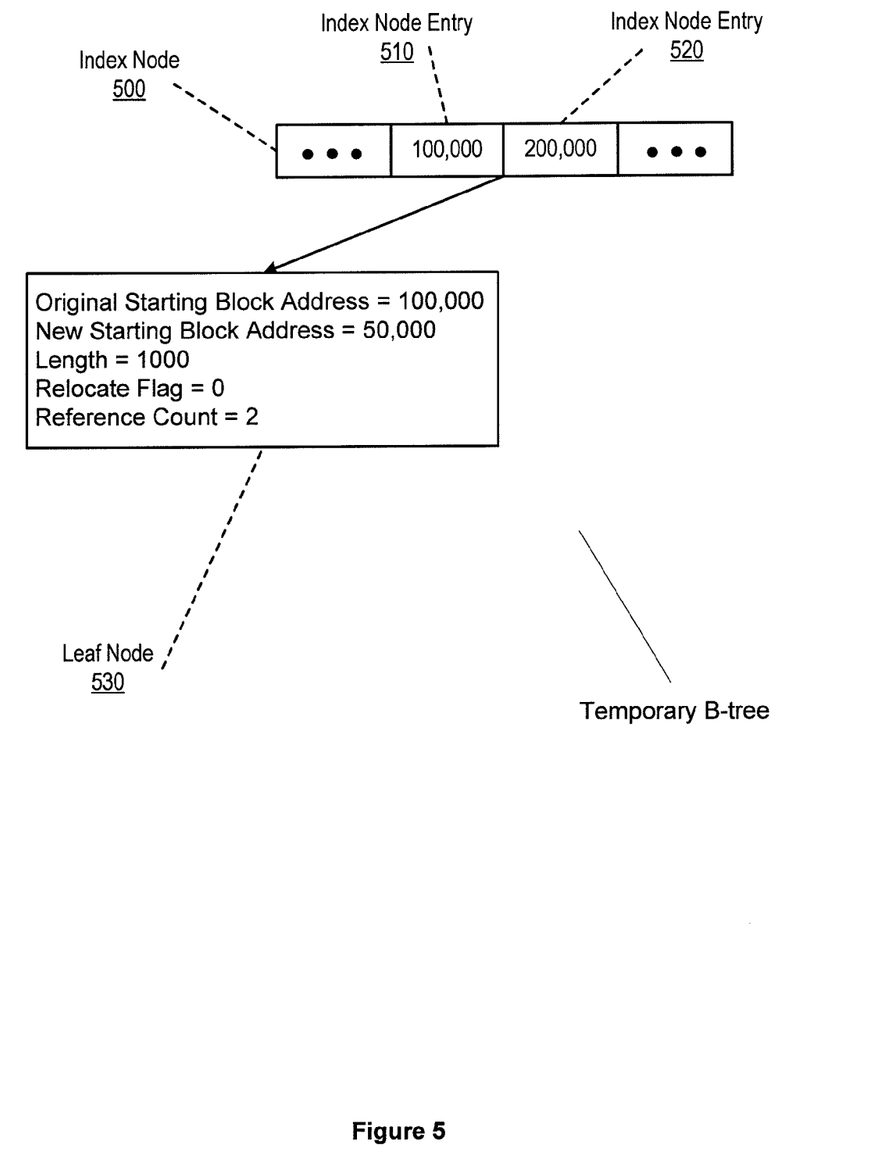
FIG. 5 is a diagram of an embodiment of a temporary B-tree data structure used in conjunction with an embodiment of the invention.

In this example, the new mapping information indicates that the extent contents have been moved to block address 50,000 and that the old extent started at block 100,000. FIG. 5 illustrates an example leaf node (530) that corresponds to this example. While the leaf node in the temporary B-tree is similar to the RCT B-tree, the leaf nodes in the temporary B-tree contains additional mapping information in order to track the original and relocated memory addresses of the shared extents.

At this point, the following information is accessible: the new mapping information in the temporary B-tree leaf node, a pointer to the second inode, and a pointer to the RCT B-tree leaf node. The second inode is updated according to the new mapping information in the temporary B-tree leaf node (370). In this example, the second inode now references the extent beginning at physical block 50,000. The Reference Count flag in the RCT B-tree leaf node is decremented (365). In this example, the RCT B-tree leaf node Reference Count is decremented from 1 to 0.

The reference count of the RCT B-tree leaf node is again accessed to determine whether all shared inodes have been processed (375). If the Reference Count field of the RCT B-tree leaf node is zero, all inodes have been processed.

After all inodes that shared the original extents are processed, the leaf node in the RCT B-tree is re-initialized to reflect to the completion of the update of all inodes. The Reference Count flag in the RCT B-tree leaf node is reset to the original count, as recalled from the temporary B-tree leaf node. The Relocate Flag in the RCT B-tree is cleared. The RCT B-tree leaf node is reset to allow for the event that the recently moved extent is moved again. The starting block address of the leaf node is updated with the new mapping information as recalled from the temporary B-tree leaf node. In this example, the starting block address of the RCT B-tree leaf node is set to 50,000, which results in the RCT B-tree leaf node being moved to another location within the RCT B-tree. The extent at the old physical memory address is released (395), the temporary B-tree is deleted (397), and the Mode update process for the shared extent is finished.

Figure 4:
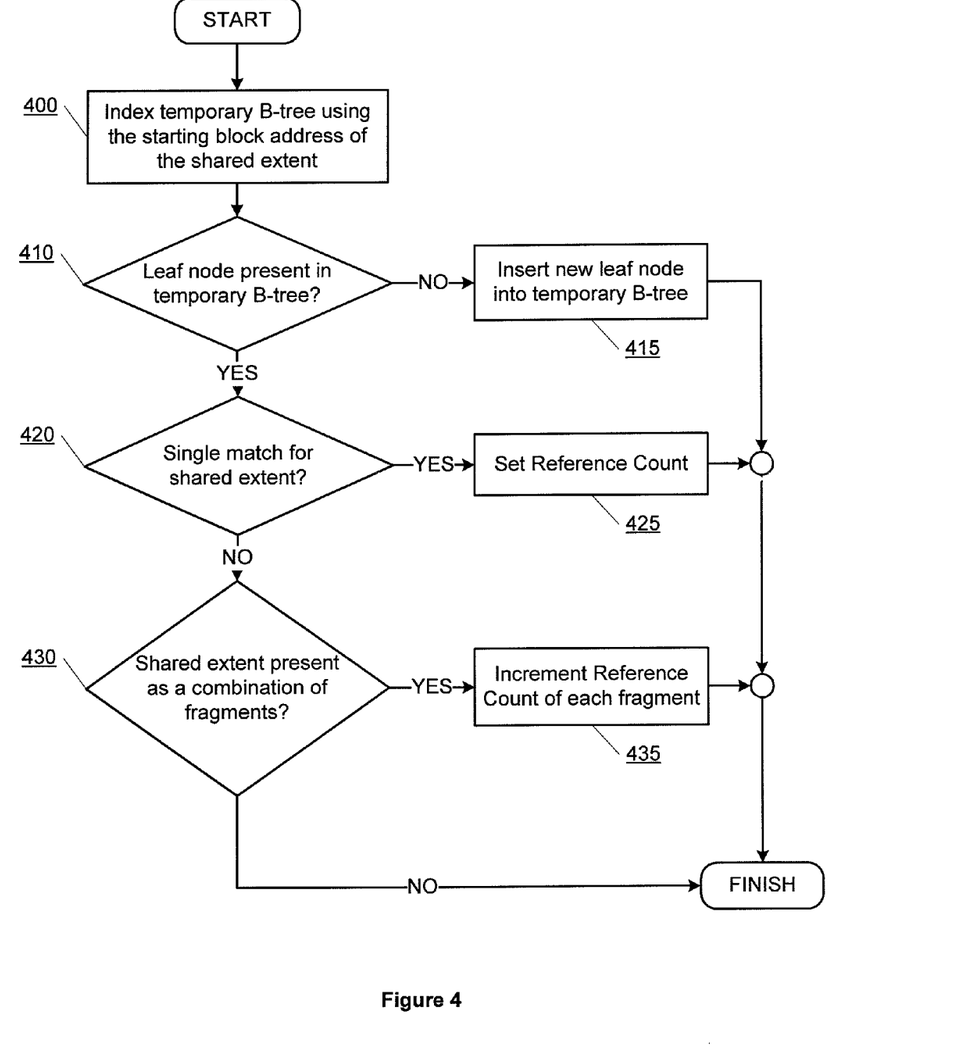
FIG. 4 is a simplified flow diagram illustrating a process for constructing and maintaining a B-tree data structure used in conjunction with one embodiment of the present invention.

FIG. 4 illustrates creation and building of the temporary B-tree. The temporary B-tree stores a leaf node for shared extents. Since an extent can range across any number of blocks, the difference in overhead between tracking blocks and tracking extents is substantial. For example, given an extent that ranges across 1000 blocks, the size of the temporary B-tree used to update the relevant Modes is orders of magnitude smaller than if only blocks were tracked.

Further efficiencies are achieved by combining adjacent extents into a single leaf node within the temporary B-tree. If adjacent extents are referenced by the same set of Modes, then references to those extents can be combined in the temporary B-tree. If the adjacent extents do not have the same set of Modes referencing the adjacent extents, they will not be combined because different sets of Modes require separate processing.

Figure 6:
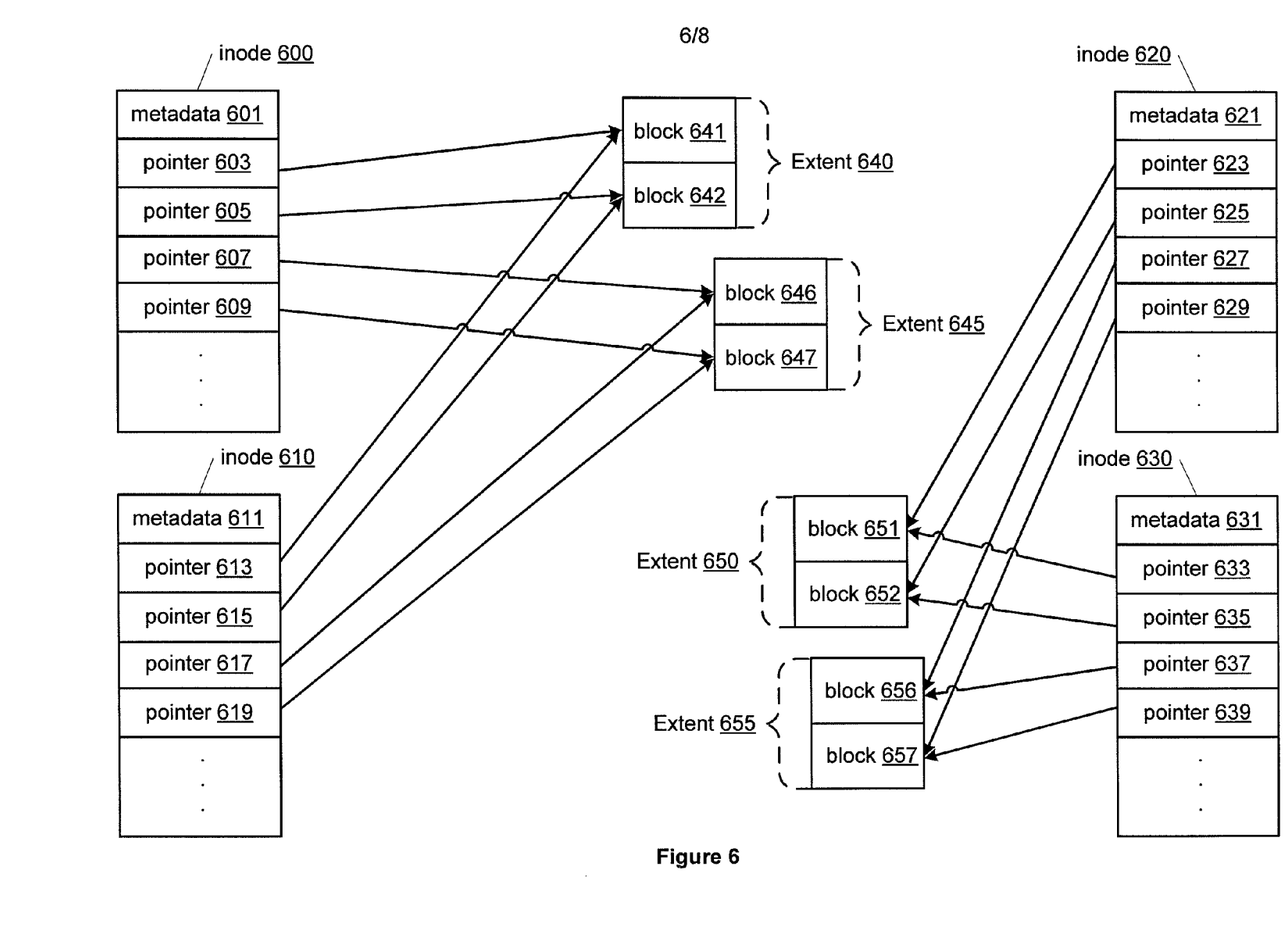
FIG. 6 is a diagram of multiple inodes sharing various extents of memory.

For example, FIG. 6 illustrates two sets of Modes, the first set is Mode 600 and Mode 610, and the second set is Mode 620 and Mode 630. The first set, Mode 600 and Mode 610 both reference extent 640 and extent 645. If extent 640 is adjacent to extent 645, it would be possible to combine these extents into a single leaf node within the temporary B-tree. However, if extent 645 were adjacent to extent 650, it would not be possible to combine the tracking for these extents into one leaf node within the temporary B-tree. The reason extent 645 and extent 650 could not be combined is that extent 650 is referenced by a different set of Modes, mode 620 and Mode 630. A combination of extent 645 and 650 would result in all four Modes sharing memory contents, where the correct case is that Mode 600 shares memory with Mode 610 and Mode 620 shares memory with Mode 630.

The temporary B-tree in FIG. 4, similar to the RCT B-tree, is indexed by the starting block address of a shared extent. This starting block address will be the same for each of the set of Modes referencing the shared extent (400). The starting block address serves as the key to finding a leaf node, if a leaf node already exists (410). If the starting block address is not an index for an existing leaf node in the temporary B-tree, a new leaf node is inserted into the temporary B-tree (415), and the update to the temporary B-tree is finished.

If the leaf node is already present in the temporary B-tree, the next step is deciding if there is a single match for the shared extent block address (420). If there is a single match, the Reference Count flag of the leaf node is set to the number of inodes sharing the extent (425), and the update to the temporary B-tree is finished.

If the shared extent is present as a combination of fragments (430), then each of the leaf nodes sharing the starting block address need to set their respective Reference Count flags to the number of inodes sharing the extent (435), and the update to the temporary B-tree is finished.

Once each of the above cases is considered and the leaf node or leaf nodes in the temporary B-tree are created or updated, this portion of the overall inode update process is complete.

While the greatest improvement in the inode update process will occur when the extents shared by the inodes are large, the present invention continues to be efficient under different circumstances. For example, not every area of shared memory will be a large extent. In this case, the shared memory referenced by a set of inodes may be stored within a single block, or stored within non-contiguous blocks. Under these circumstances, the RCT B-tree will continue to work, and the RCT B-tree will reference both extents and blocks. Further, the RCT B-tree continues to work when the referenced shared memory is any combination of extents and blocks, all extents, or all blocks.

Memory management is a necessary task performed by a file system, and this task can be made more efficient by introducing a new data structure focused on storing information on the shared areas of memory. As disclosed herein, the new data structure would exist independently of the traditional file system maintenance of inodes. Use of this new data structure provides a file system with a method for managing updates to inodes sharing memory by processing extents instead of blocks. Further, the efficiency gained by the disclosed inode update process will increase as the number of blocks within an extent increases.

An Example Computing And Network Environment

As shown above, the present invention can be implemented using a variety of computer systems and networks. An example of one such computing and network environment is described below with reference to FIGS. 7 and 8.

Figure 7:
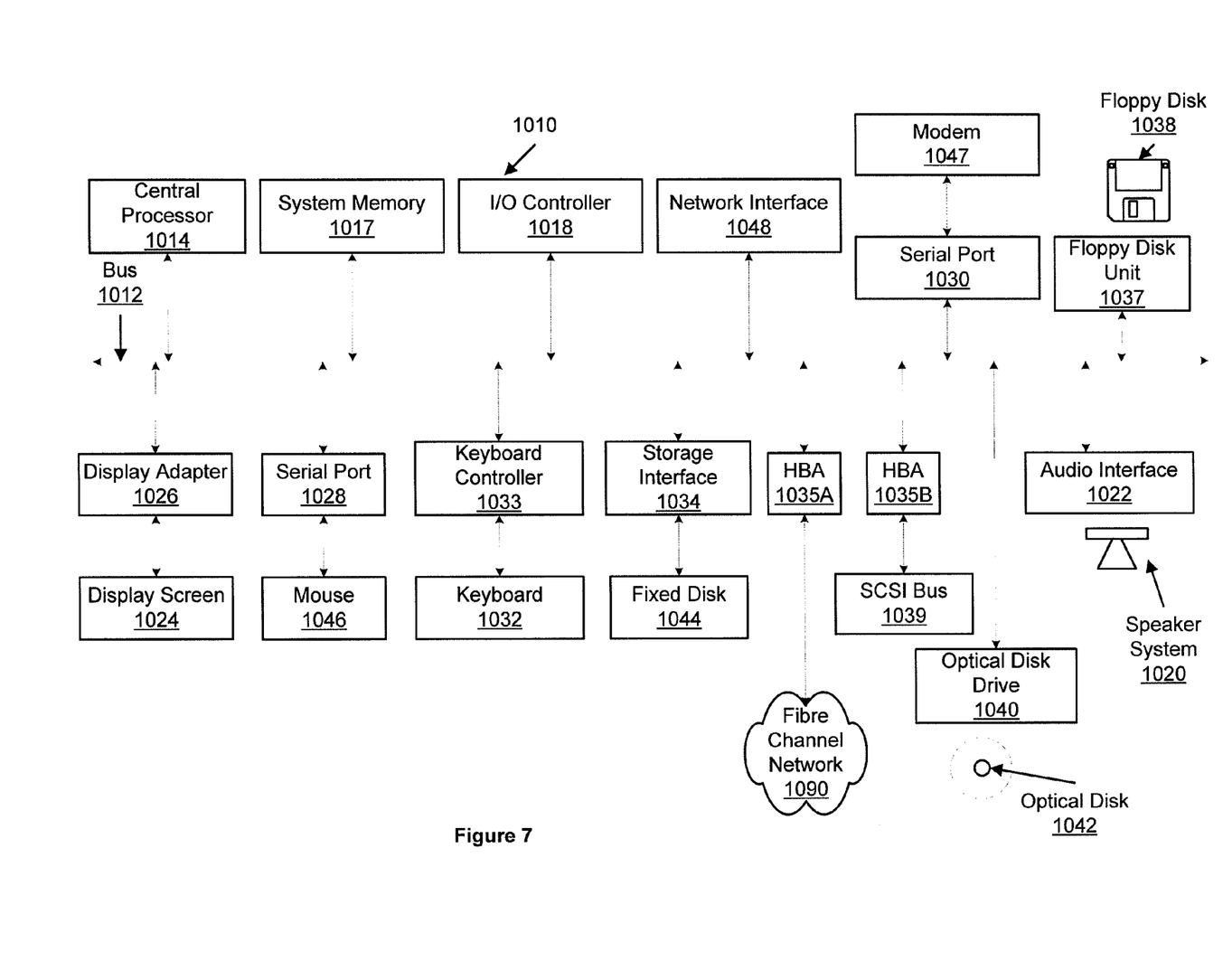
FIG. 7 is a block diagram of a computer system suitable for implementing aspects of the present invention.

FIG. 7 depicts a block diagram of a computer system 1010 suitable for implementing aspects of the present invention. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a computer-readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048. For example, one or more of the embodiments disclosed herein may be encoded as a computer program (also referred to as computer software, software applications, computer-readable instructions, or computer control logic) on a computer-readable medium. Examples of computer-readable media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium. Non-transitory computer-readable media include all forms of computer-readable media except for a transitory, propagating signal.

Storage interface 1034, as with the other storage interfaces of computer system 1010, can connect to a standard computer-readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 7 need not be present to practice the present invention. The devices and subsystems can be interconnected in different ways from that shown in FIG. 7. The operation of a computer system such as that shown in FIG. 10 is readily known in the art and is not discussed in detail in this application. Code to implement the present invention can be stored in computer-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
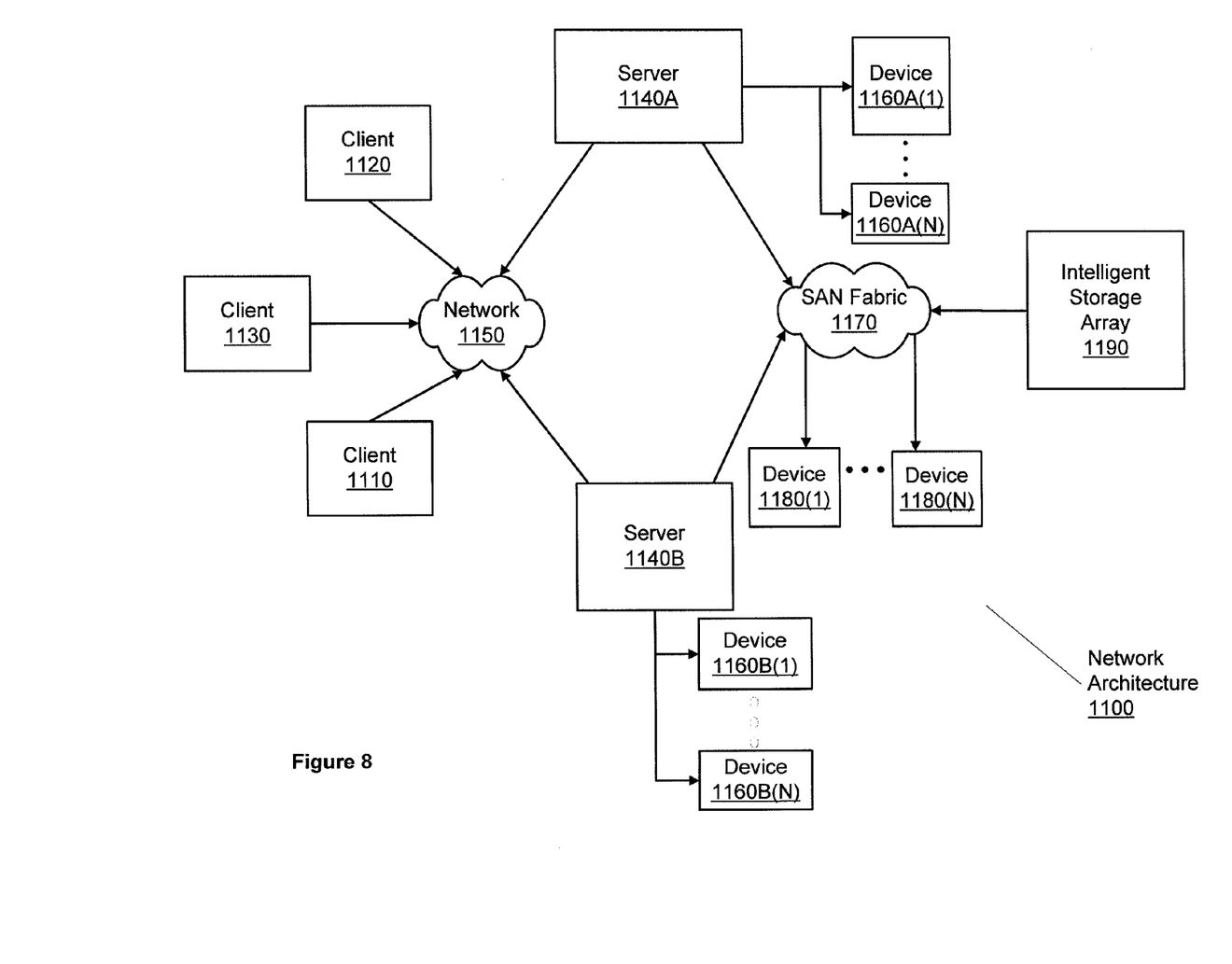
FIG. 8 is a block diagram of a network architecture suitable for implementing aspects of the present invention.

FIG. 8 is a block diagram depicting a network architecture 1100 in which client systems 1110, 1120 and 1130, as well as storage servers 1140A and 1140B (any of which can be implemented using computer system 1010), are coupled to a network 1150. Storage server 1140A is further depicted as having storage devices 1160A(1)-(N) directly attached, and storage server 1140B is depicted with storage devices 1160B (1)-(N) directly attached. Storage servers 1140A and 1140B are also connected to a SAN fabric 1170, although connection to a storage area network is not required for operation of the invention. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048, or some other method can be used to provide connectivity from each of client computer systems 1110, 1120, and 1130 to network 1150. Client systems 1110, 1120, and 1130 are able to access information on storage server 1140A or 1140B using, for example, a web browser or other client software (not shown). Such a client allows client systems 1110, 1120 and 1130 to access data hosted by storage server 1140A or 1140B or one of storage devices 1160A(1)- (N), 1160B(1)-(N), 1180(1)-(N) or intelligent storage array 1190. FIG. 8 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The previous embodiments are merely examples, and, in fact, many other embodiments can be implemented which achieve similar functionality. For example, in the case where a single data structure is used to maintain the shared memory information for every volume in a multi-volume system, a virtual address can be used as an index into the data structure. As discussed above, the physical address alone is not enough for uniquely identifying an extent. However, a virtual address is unique across every volume of the cluster file system and the virtual address is used for uniquely arriving at a single record within the data structure. In this case, the record in the data structure can include an additional field for identifying the volume at which the physical block address of the extent begins.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method for updating inodes in a file system comprising:
   tracking shared extents within the file system, wherein the tracking comprises
      creating a new record in a data structure, in response to two or more files sharing an extent, wherein
         the new record comprises mapping information for the extent,
         the extent is one of the shared extents within the file system,
         the extent is stored at a first memory location of a memory device managed by the file system,
         a first file of the two or more files is associated with a first inode, and
         a second file of the two or more files is associated with a second inode;
   determining whether the extent has been relocated based on information in the new record;
   in response to the determining, wherein the determining indicates that the extent has not been relocated
      relocating the extent, and
      updating the information to indicate that the extent has been relocated;
   updating the first inode to reference a second extent at a new memory location of the memory device, wherein
      the updating the first inode is in response to contents of the extent being relocated to the new memory location; and
   updating the second inode to reference the second extent at the new memory location, wherein
      the updating the first and second inodes depends on the new record.

2. The method of claim 1 further comprising:
   incrementing a reference count variable stored in the new record each time the extent is shared with an additional file; and
   decrementing the reference count variable stored in the new record each time a file sharing the extent ceases to share the extent.

3. The method of claim 1 wherein
   the new record further comprises a list of pointers, wherein
      each pointer in the list of pointers references one of a plurality of inodes, and
      each inode in the plurality of inodes is referenced by a pointer in the list of pointers in response to the file system identifying the inode as sharing a memory area.

4. The method of claim 1 further comprising
   maintaining a corresponding data structure for each volume of a multi-volume file system.

5. The method of claim 1 further comprising
   maintaining the data structure for a plurality of volumes of a multi-volume file system; and
   indexing a multi-volume file system record in the data structure, wherein
      the indexing uses both a key associated with the volume and a starting block number of the volume extent.

6. The method of claim 4 further comprising
   maintaining the data structure for a plurality of processors within a cluster file system, wherein
      the creating the new record is in response to an operation by one processor of the plurality of processors resulting in the extent being shared.

7. The method of claim 2 further comprising
   increasing a size variable of the new record, in response to the second extent being referenced by the first inode, wherein
      the second extent is adjacent to the extent.

8. The method of claim 1 further comprising
   indexing the data structure with a starting block number of the extent;
   identifying the new record in the data structure, in response to the indexing; and
   updating a starting block number variable in the data structure to equal the new memory location.

9. The method of claim 8 further comprising for each inode referencing the extent:
   updating the inode referencing the extent to reference the new memory location; and
   decrementing a reference count variable of the new record, wherein
      before the extent is relocated, the reference count variable is equal to a number of inodes referencing the extent.

10. The method of claim 9 further comprising
    creating a temporary data structure, wherein
       the temporary data structure comprises a temporary record comprising
          a starting block variable,
          a size variable,
          a reference count variable, and
          mapping information storing a mapping between an original memory location and the new memory location.

11. The method of claim 10 further comprising
    indexing the temporary data structure using the extent as a key, wherein the indexing is performed prior to the updating the first inode;
    searching the temporary data structure for a record indexed to the extent;
    if the temporary data structure has no record indexed to the extent, generating the temporary record with the extent as an index;
    if the temporary data structure has one or more records indexed to the extent, updating a reference count variable of each record.

12. A non-transitory computer-readable storage medium storing instructions executable by a processor, wherein the instructions are executable to:
  track shared extents within a file system, wherein tracking the shared extents comprises
    creating a new record in a data structure, in response to two or more files sharing an extent, wherein
      the new record comprises mapping information for the extent,
      the extent is one of the shared extents within the file system,
      the extent is stored at a first memory location of a memory device managed by the file system,
      a first file of the two or more files is associated with a first inode, and
      a second file of the two or more files is associated with a second inode;
  determine whether the extent has been relocated based on information in the new record;
  in response to determining the extent has not been relocated
    relocate the extent, and
    update the information to indicate that the extent has been relocated;
  update the first inode to reference a second extent at a new memory location of the memory device, wherein
    the update to the first inode is in response to contents of the extent being relocated to the new memory location; and
  update the second inode to reference the second extent at the new memory location, wherein
    the update to the first and second inodes depends on the new record.

13. The non-transitory computer-readable storage medium of claim 12, wherein the instructions are further configured to:
  increment a reference count variable stored in the new record each time the extent is shared with an additional file; and
  decrement the reference count variable stored in the new record each time a file sharing the extent ceases to share the extent.

14. The non-transitory computer-readable storage medium of claim 12, wherein the instructions are further configured to:
  index the data structure with a starting block number of the extent;
  identify the new record in the data structure, in response to indexing the data structure; and
  update a starting block number variable in the data structure to equal the new memory location.

15. The non-transitory computer-readable storage medium of claim 12, wherein the instructions are further configured to
  consolidate a memory range spanning the extent and the second extent, wherein
    the second extent is at a physical memory address adjacent to the extent,
    and
    the memory range spanning the extent and the second extent is stored within the new record of the data structure.

16. An apparatus comprising:
a memory managed by a file system; and
a processor coupled to the memory, wherein
  the processor is configured to
  create a new record in a data structure, in response to two or more files sharing an extent, wherein
    the new record comprises mapping information for the extent,
    the extent is one of the shared extents within the file system,
    the extent is stored on a memory device managed by the file system,
    a first file of the two or more files is associated with a first inode, and
    a second file of the two or more files is associated with a second inode,
  determine whether the extent has been relocated based on information in the new record,
  in response to determining the extent has not been relocated
    relocate the extent, and
    update the information to indicate that the extent has been relocated,
  update the first inode to reference a second extent at a new memory location, wherein
    the update to the first inode is in response to contents of the extent being relocated to the new memory location, and
  update the second inode to reference the second extent at the new memory location, wherein
    the update to the first and second inodes depends on the new record.

17. The apparatus of claim 16 wherein the processor is further configured to
  increment a reference count variable stored in the new record each time the extent is shared with an additional file; and
  decrement the reference count variable stored in the new record each time a file sharing the extent ceases to share the extent.

18. The apparatus of claim 17 wherein the processor is further configured to
  index the data structure with a starting block number of the extent;
  identify the new record in the data structure, in response to indexing the data structure; and
  update a starting block number variable in the data structure to equal the new memory location.

19. The apparatus of claim 16 wherein the processor is further configured to
  consolidate a memory range spanning the extent and the second extent, wherein
    the second extent is at a physical memory address adjacent to the extent,
    and
    the memory range spanning the extent and the second extent is stored within the new record of the data structure.

* * * * *